F. E. & R. A. PALIN.
SEAT SPRING FOR MOTOR CYCLES.
APPLICATION FILED JUNE 17, 1912.
1,061,199.
Patented May 6, 1913.
2 SHEETS—SHEET 1.
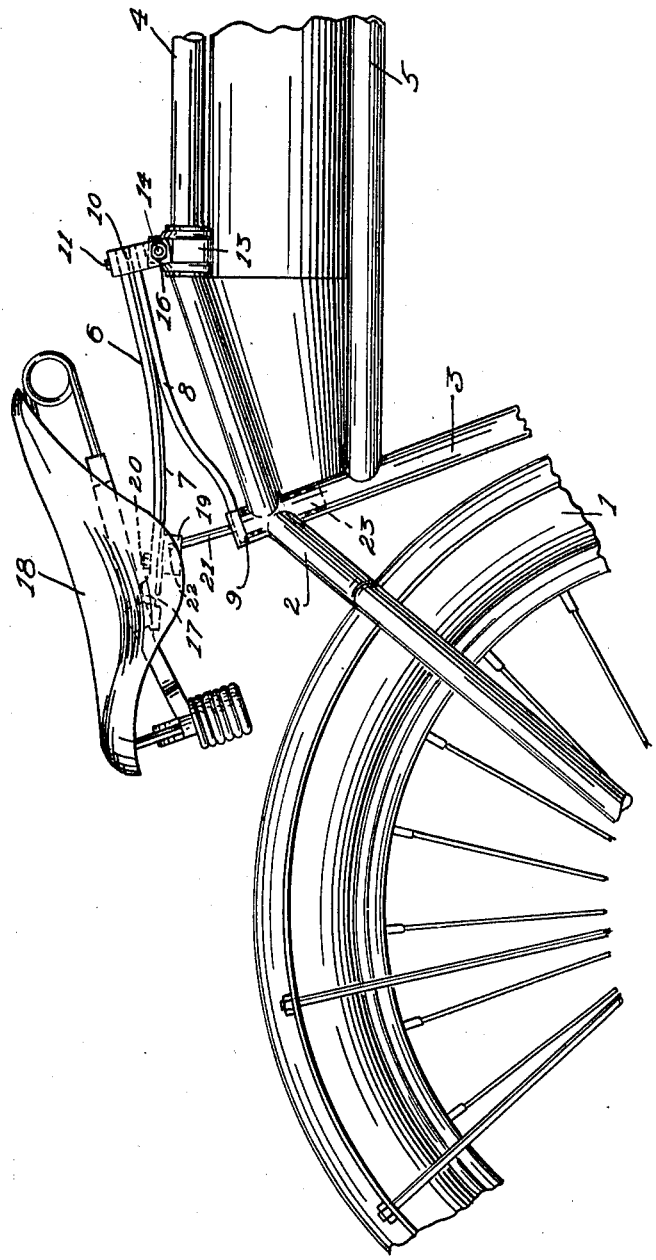
WITNESSES:
A. H. Kephart
Frank A. Sinney
INVENTOR
F. E. PALIN and R. A. PALIN.
BY
Carlos P. Griffin
ATTORNEY

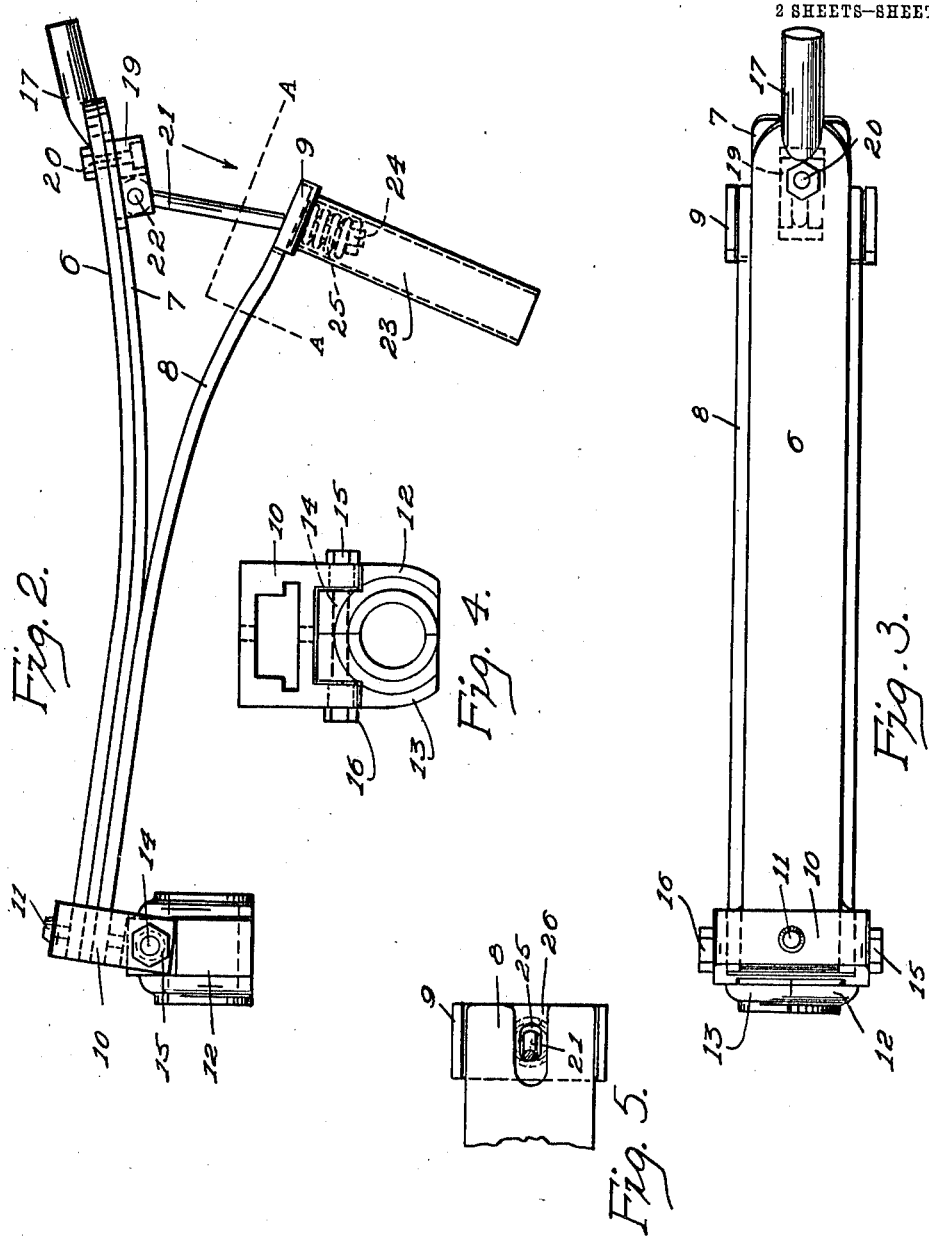

UNITED STATES PATENT OFFICE.

FRANK E. PALIN AND RONALD A. PALIN, OF SAN MATEO, CALIFORNIA.

SEAT-SPRING FOR MOTOR-CYCLES.

1,061,199.  Specification of Letters Patent.  Patented May 6, 1913.

Application filed June 17, 1912. Serial No. 704,223.

*To all whom it may concern:*

Be it known that we, FRANK E. PALIN and RONALD A. PALIN, citizens of the United States, residing at San Mateo, in the county of San Mateo and State of California, have invented a new and useful Seat-Spring for Motor-Cycles, of which the following is a specification in such full and clear terms as will enable those skilled in the art to construct and use the same.

This invention relates to a seat spring for motor-cycles and its object is to produce an extremely resilient spring, while at the same time providing means for preventing the spring from swaying laterally as well as to prevent the spring from rising too high.

Another object of the invention is to provide means whereby the spring may be readily applied to almost any motorcycle.

In the drawings in which the same numeral of reference is applied to the same portion throughout the several views. Figure 1 is a side elevation of a portion of a motorcycle showing the upper frame thereof and showing this spring and seat applied thereto. Fig. 2 is a side elevation of the spring separate from the machine. Fig. 3 is a plan view of the spring. Fig. 4 is an end view of the fixture for securing the spring to the frame of the machine, and Fig. 5 is a view of the lower spring and saddle upon which it is carried on the line A—A Fig. 2.

The numeral 1 represents the wheel of the machine, 2 a portion of the frame extending to the rear axle, 3 an upright portion of the frame and 4 and 5 represent horizontal portions of the frame. This spring comprises three leaves 6, 7 and 8, two of which are secured together while the third leaf rests upon a saddle 9. All three of these leaf springs are secured in a clip 10 at their front ends, a suitable rivet 11 being used to secure them to said clip. This clip is pivotally secured to a clamp having two members, 12 and 13, said members having a bolt 14 passed therethrough. This bolt is provided with two nuts 15 and 16 which bear upon the clamp members to hold them securely on the tube 4, while at the same time permitting the clip 10 to move pivotally with respect to the clamp.

The upper leaf spring 6 has a projecting horn 17 upon which an ordinary bicycle saddle 18 is placed. The spring 6 has a block 19 secured thereto by means of a bolt 20. The block is slightly smaller than a hole cut in the spring 7 through which said block passes. At the front end this block is pivoted to a bolt 21 by means of a pin 22. This bolt extends down into a tube 23 which carries the saddle 9 for the spring 8 and it has a nut 24 which bears upon a spiral spring 25, the object of which is to prevent the spring 6 from rising too high with its load. The spring 8 is slotted as indicated in Fig. 5 at 26 in order to give the necessary longitudinal movement of said spring when carrying its load. The post 23 is secured with the frame bar 3 in a suitable manner, or it may be simply forced tightly therein.

Having thus described our invention what we claim as new and desire to secure by Letters Patent of the United States, is as follows:

1. In a motorcycle spring, a clamp adapted to be passed around one of the bars of a motorcycle, flat divergent leaf springs secured to said clamp and extending rearwardly therefrom, a seat carried by one of said springs, and a saddle upon which the end of another of said springs bears, substantially as described.

2. In a seat spring for motorcycles, a clamp for securing the spring to the frame of the motorcycle, a series of divergent leaf springs having their ends secured to said clamp and extending rearwardly therefrom, a seat carried by one of said springs, a saddle upon which another of said springs bears, and resilient means to prevent the seat from rising more than a determined amount, substantially as described.

3. In a seat spring for motorcycles, a clamp, a clip pivoted to said clamp, divergent springs secured to said clip and extending rearwardly therefrom, a seat secured to one of said springs, a saddle upon which another of said springs bears, a seat post secured to said saddle, a bolt secured to the spring carrying the seat and extending into the saddle post, and a spring within said saddle post to prevent the seat spring from rising too high, substantially as described.

4. In a motorcycle spring, a clamp, a clip pivoted to said clamp, a plurality of leaf springs rigidly secured to said clip and diverging from each other as they recede from the clip, a seat carried by one of said springs, a saddle upon which the other of said springs bears, a post connected with said saddle, a pivoted bolt connected to the upper spring and extending into the saddle post, and a spiral spring on said bolt within the saddle post for preventing the seat spring from rising too high, substantially as described.

In testimony whereof we have hereunto set our hands this 8th day of June A. D. 1912, in the presence of the two subscribed witnesses.

FRANK E. PALIN.
RONALD A. PALIN.

Witnesses:
GEO. A. KERLETT,
W. B. BENOIST.

Copies of this patent may be obtained for five cents each, by addressing the "Commissioner of Patents, Washington, D. C."